G. W. HUSSEY.
COUPLING FOR A TRACTOR AND PLOW.
APPLICATION FILED JAN. 25, 1916.
1,182,910.
Patented May 16, 1916.
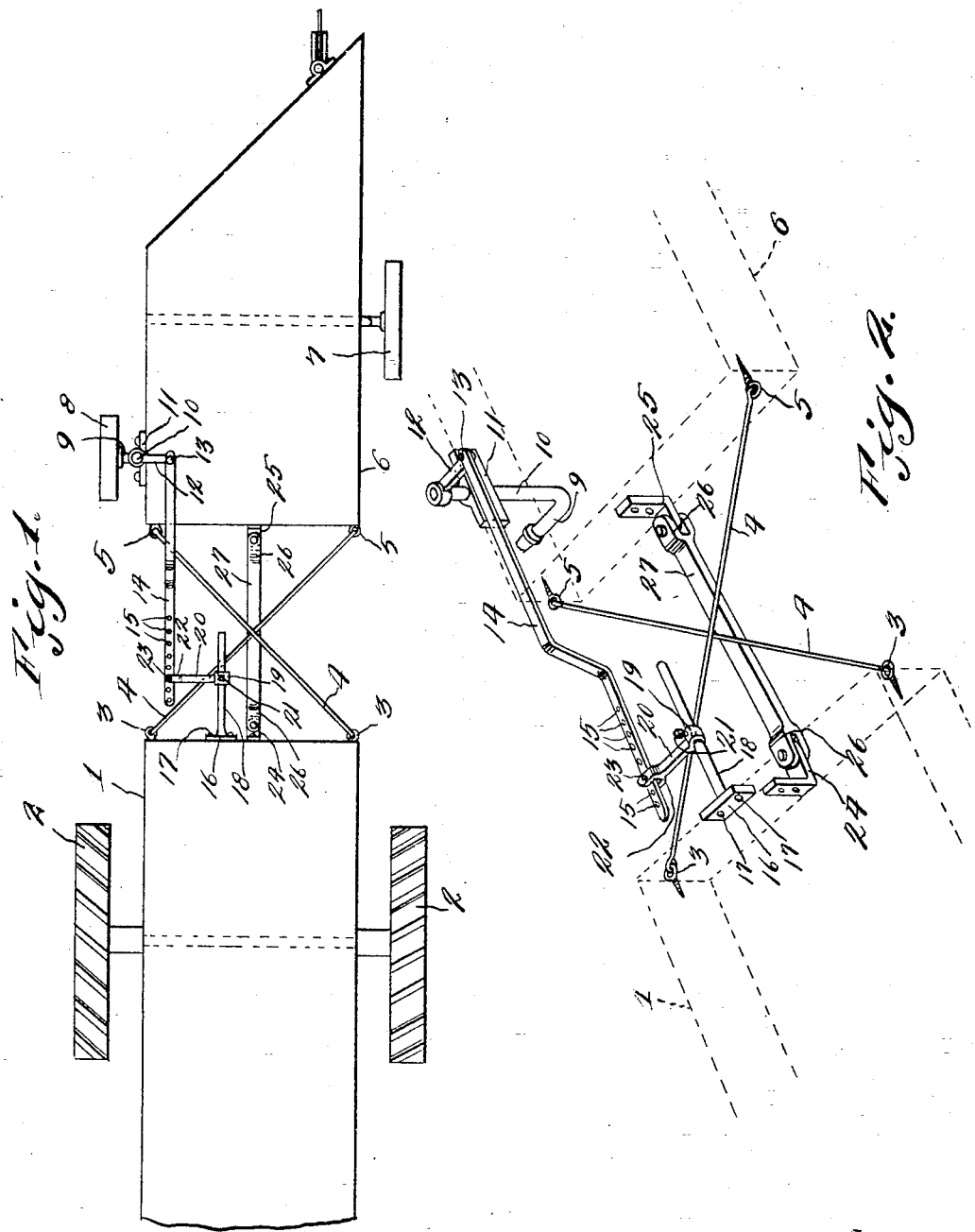

UNITED STATES PATENT OFFICE.

GEORGE W. HUSSEY, OF GLASCO, KANSAS.

COUPLING FOR A TRACTOR AND PLOW.

1,182,910.  Specification of Letters Patent.  Patented May 16, 1916.

Application filed January 25, 1916. Serial No. 74,151.

*To all whom it may concern:*

Be it known that I, GEORGE W. HUSSEY, a citizen of the United States, residing at Glasco, in the county of Cloud, State of Kansas, have invented a new and useful Coupling for a Tractor and Plow; and I do hereby declare the following to be a full, clear, and exact description of the invention, such as will enable others skilled in the art to which it appertains to make and use the same.

This invention relates to an improved coupling between a tractor and a plow, particularly a gang plow or the like, and an object of the invention is the provision of a connection having efficient, simple and practical features of construction, whereby as the tractor makes a turn, the plow will be moved, so that it will make a full sweep, and properly and accurately follow the tractor.

One of the features of the invention is that the coupling includes connections between the tractor, and one of the supporting wheels of the plow, so that the supporting wheel will be turned correspondingly to the direction of the sweep or turn of the plow.

In practical fields the details of construction may necessitate alterations, falling within the scope of what is claimed.

The invention comprises further features and combination of parts, as hereinafter set forth, shown in the drawings and claimed.

In the drawings: Figure 1 is a plan view showing the outline of a tractor and a plow, showing the coupling connected therebetween. Fig. 2 is a view in perspective of the coupling, illustrating the outline of parts of a tractor and a plow in dotted lines.

Referring more especially to the drawings, 1 designates an outline of the frame of a tractor, and 2 denotes the supporting wheel. The rear of the frame of the tractor is provided with eyes 3 adjacent each side of the frame 1, in which eyes the rods 4 are connected. These rods 4 are crossed and have their other ends connected to the eyes 5 of any suitable or conventional form of gang plow frame 6. The gang plow frame is provided with supporting wheels 7 and 8. The wheel 8 is journaled upon a laterally extending stub axle 9 of the vertical rocking rod or shaft 10, which is mounted in a suitable bearing 11 of the frame of the plow. The upper end of the shaft or rod 10 has a lateral arm 12 movable therewith, and connected at 13 to the arm 12 is a link bar 14, the forward portion of which is provided with a plurality of apertures 15. A suitable plate 16 is secured at 17 to the frame of the tractor, and is provided with a laterally extending rod 18, on which the sleeve 19 of the arm 20, is adjustably secured by the set bolt 21. The arm 20 has its end portion opposite the sleeve 19 provided with forks 22, which straddle the apertured forward portion of the bar 14, and are provided with a pin 23 passing through said forks, and designed to pass through any one of the apertures 15, in order to adjustably connect the arm 20 to said bar 14. Secured upon the rear end of the conventional frame (which is shown merely in an outline) of the tractor is an angular plate 24, and on the forward end of the gang plow, which is correspondingly shown in outline is an angular plate 25, and connecting said plates 24 and 25 is the link bar 27 having forked ends 26. From the foregoing it is to be seen that the frames of the tractor and the plow are so connected by the crossing rods, that when the tractor turns, said crossing rods will so move as to turn the gang plow, so that it will completely and properly follow in the tracks of the tractor, while the bar 14 (which is connected to the rearwardly extending arm or projection 18 by the arm 20) will turn the supporting wheel 8, so that it will travel correspondingly with the travel of the gang plow.

The invention having been set forth, what is claimed as new and useful is:—

1. In combination with a tractor frame and a plow frame, the plow frame being spaced at an interval from the rear of the tractor frame, a link bar connecting the two frames, and a pair of crossing rods connecting the two frames, whereby the plow frame will accurately follow the tractor frame, said plow frame having a swiveled supporting wheel including a vertical rocking rod or shaft, and a connection between the vertical rocking rod and the tractor, whereby the swiveled supporting wheel may be turned correspondingly with the direction of travel of the plow.

2. In combination with a tractor frame and a plow frame, the plow frame being spaced at an interval from the rear of the tractor frame, a link bar connecting the two frames, and a pair of crossing rods connecting the two frames, whereby the plow frame will accurately follow the tractor frame, said plow frame having a swiveled supporting wheel including a vertical rocking rod or shaft, and a connection between the vertical rocking rod and the tractor, whereby the swiveled supporting wheel may be turned correspondingly with the direction of travel of the plow, said connections comprising a lateral arm on the upper end of the vertical rocking rod or shaft, a projection extending rearwardly from the tractor and having an adjustable laterally extending arm, a bar having its rear end connected to the first lateral arm and having its forward end adjustably connected to the second laterally extending arm.

In testimony whereof I have signed my name to this specification in the presence of two subscribing witnesses.

GEORGE W. HUSSEY.

Witnesses:
L. NOEL,
R. G. BRACKEN.

Copies of this patent may be obtained for five cents each, by addressing the "Commissioner of Patents, Washington, D. C."